United States Patent [19]

Brower

[11] Patent Number: 5,167,704

[45] Date of Patent: Dec. 1, 1992

[54] SOY INK BASED ART MEDIA

[76] Inventor: Sharen E. Brower, P.O. Box 28, Newell, Iowa 50568

[21] Appl. No.: 686,141

[22] Filed: Apr. 16, 1991

Related U.S. Application Data

[63] Continuation-in-part of Ser. No. 438,198, Nov. 20, 1989, abandoned.

[51] Int. Cl.$^5$ .................. C09D 11/06; C08L 91/00; C08L 93/00
[52] U.S. Cl. .................. 106/28 R; 106/29 R; 106/220; 106/241; 106/266; 106/30 R
[58] Field of Search .................. 106/19, 28, 29, 266, 106/220, 241

[56] References Cited

U.S. PATENT DOCUMENTS

| | | | |
|---|---|---|---|
| 2,385,800 | 2/1941 | Douty et al. | 106/228 |
| 2,877,130 | 3/1959 | Caron et al. | 106/228 |
| 3,707,387 | 12/1972 | Enomoto et al. | 106/253 |
| 3,920,597 | 11/1975 | Nicks et al. | 106/266 |
| 3,950,288 | 4/1976 | Herbst et al. | 260/22 |
| 3,997,498 | 12/1976 | Reese et al. | 260/38.8 |
| 4,045,232 | 8/1977 | Parkinson | 106/28 |
| 4,056,495 | 11/1977 | Kawamura et al. | 106/252 |
| 4,131,579 | 12/1978 | Mummenthey et al. | 106/252 |
| 4,154,618 | 5/1979 | Burke | 106/27 |
| 4,212,642 | 7/1980 | Della Casa et al. | 8/470 |
| 4,243,694 | 1/1981 | Mansukhani | 427/14.1 |
| 4,385,149 | 5/1983 | Tsuchiya et al. | 524/313 |
| 4,419,139 | 12/1983 | Gooch et al. | 106/252 |
| 4,469,516 | 9/1984 | Schneider et al. | 106/23 |
| 4,612,052 | 9/1986 | Schwartz | 106/31 |
| 4,704,163 | 11/1987 | Baratto et al. | 106/20 |
| 4,719,254 | 1/1988 | Levine | 106/253 |

Primary Examiner—Mark L. Bell
Assistant Examiner—Helene Klemanski
Attorney, Agent, or Firm—Zarley, McKee, Thomte, Voorhees & Sease

[57] ABSTRACT

In one embodiment of the new art medium soy ink, and pigment, and a non-petroleum based organic solvent which improves soy ink drying speed are mixed to provide an art medium which simulates the appearance of water colors without the disadvantage. In another embodiment the general use of paint composition comprises soy ink, pigment and natural alkyd resin to provide a paint covering of improved properties.

9 Claims, No Drawings

SOY INK BASED ART MEDIA

CROSS REFERENCE TO RELATED APPLICATION

This application is a continuation-in-part of my co-pending application, Ser. No. 438,198, filed Nov. 20, 1989 now abandoned and entitled SOY INK BASED ART MEDIA.

BACKGROUND OF THE INVENTION

This invention relates to an improved soy oil based ink and the subsequent development of a soy oil based medium which has broad application to not only the printing industry but writing instrument industry, the coding and marking ink industry, coating industry, dye industry as well as in the fine arts.

Soy ink has only recently been developed and has been generally publicly available since May, 1987. Initial research of the original soy ink was done by the American Newspaper Publisher's Association, with the idea in mind of producing an alternative to petroleum based inks for use in the newspaper industry. Currently, soy ink is available for use in the newsprinting industry only and due to problems with drying, misting, gumming, general acceptance is not evident. These problems have restricted any other application of a soy oil based product to this industry alone.

Soy ink, as used by the newsprinting industry is comprised of soy oil, and conventional pigment material. It is by definition, a non-drying ink that must be changed, formula-wise, by the individual printer to suit a particular printing job, press or paper substrate. Individual printers rely on common knowledge information and add cobalt, petroleum based thinners, resins and waxes to improve the ink's performance.

Compared to petroleum based inks, soy ink, while a more environmentally safe product, is also a much slower drying product. This slower drying can cause smudging, bleeding through, and valuable time loss.

Soy ink, as now available on the market, is generally comprised of the ink oil, or soy oil, and conventional pigment material. Of course, for newspaper use the black ink pigment used to formulate newspaper ink is carbon black. However it goes without saying that a variety of other conventional ink pigments can be used. Currently, soy ink is available in red, yellow, blue and black pre-mixed soy ink. Among other places soy ink can be purchased through Flint Ink of 2024 96th Street, Clive, Iowa; from General Printing Ink Company of 515 Park Avenue, Des Moines, Iowa 50315; from J. M. Hubert Co. of McCook, Ill., and from U.S. Printing, Inc. of 232 Rainbow Drive, Sedalia, Mo. 65301. General information on soy ink can be obtained from the American Newspaper Publisher's Association, Office of the Director of Technical Research, 1600 Sunrise Valley Drive, Reston, Va. 22091.

One of the primary advantages of the present invention is to overcome the known deficiencies of the original soy ink developed for the newspaper industry. In addition, the present invention serves to extend application of a soy oil and pigment ink to other area of application currently enjoyed by petroleum-based or linseed oil-based formulations.

Another primary advantage of the present invention is to modify soy ink formulations so that soy ink can be used as an artist's medium to provide an art medium fully comparable to water colors which does not have the disadvantages of water colors, namely bleeding, smudging, and adverse wrinkling effects on the substrate artist's paper.

A further advantage of the present invention is to provide a general purpose paint composition based upon soy ink which has improved covering properties, which will not easily chip, wipe off, or scratch, and which can cover difficult virgin substrate surfaces such as some plastics and certain metals.

Other advantages include a highly permanent drawing ink, resistant to alkyd-based artist's paints, (such as watercolor), a solvent-based ballpoint pen ink, a highly permanent dye for fabrics and leather, a coating suitable for metals, wood, plastics, masonry and ceramics and a versatile artist's medium which, depending upon the individual is in either solvent or water-based formulation.

The method and means of providing the improved soy ink formulations to achieve the advantages above mentioned as well as others will become apparent from the detailed description of the invention which follows hereinafter.

SUMMARY OF THE INVENTION

In one embodiment, a new art medium is provided which simulates the appearance of water colors, without the normal disadvantages of water colors. In particular, soy ink is mixed with a non-petroleum based organic solvent for soy ink with the result being an improved soy ink having faster drying speed and which will not adversely impact the substrate artist's paper. It can also be used for newspaper printing. In another embodiment, a general purpose paint composition having improved covering properties is provided which comprises soy ink, pigment, and a natural alkyd resin.

A new art or industrial medium exhibiting a wide variety of application to a wide variety of substrates is realized. Unlike other products on the market, application of this soy oil medium is readily governed by the individual artist, crafter or manufacturer by adding or deleting additives. Unlike other products, it is by nature restricted to minimum addition of petroleum-based mineral spirits, dryers or other additives. Unlike other products, the soy oil medium of this invention represents a combination of knowledge of ink and of coating information, generally not considered as compatible by each field of research.

Simply stated, petroleum-based additives reduce performance and cause misting, gumming, slow drying time, and other problems experienced by the newsprinting industry. Natural gum terpenes, varnishes, dryers, resins, varnishes, waxes, solvents and chemicals used to improve brushability, dispersion of pigment wetting agents, stabilizers and thickeners improve performance and increase versatility. Unlike solvent-based mediums, interchanging of petroleum or natural terpenes is not permissible as common knowledge would indicate. Deterioration in performance is in direct proportion to the amount of petroleum added to the basic formulation.

DETAILED DESCRIPTION OF THE INVENTION

The present invention achieves the aforementioned advantages, improvements and versatility by combining non-petroleum based solvents, soya resins, waxes and other naturally occurring additives. Addition of petroleum products proportionately reduces versatility and performance which, depending upon the desired use or application may vary. (If drying time, minimal gumming or misting is acceptable to an individual who is not using a printing press, low percentages of petroleum may not adversely effect its use. A printer, however, would normally restrict as much as possible the percentage of petroleum to overcome the problems by using a greater percentage of non-petroleum additives.)

While applicant does not wish to be bound by a precise theory of operability of the present invention, it is believed that the soy oil or other naturally occurring oils are more compatible with other naturally occurring additives. It is visually apparent that petroleum-based solvent materials, dryers and other additives such as hydrocarbon solvents, modified hydrocarbon solvents such as hydrocarbon halide, and additives high in hydrocarbon content significantly reduces performance of the soy oil-based medium. Addition of natural solvents, resins, waxes, varnishes, shellacs, etc., as well as other natural oils increases performance levels. Where other plant seed oils are added, the same criteria would pertain.

Terpene oils are naturally based oils derived from certain plants, especially conifers, with terpene itself being unsaturated hydrocarbon having the empirical formula $C_{10}H_{16}$. Modified terpenes can be used such as oxygenated terpene derivatives including camphor, methyl, barneol, terineol, etc. The plant oils which may be used by thinning with terpene and/or acetone include naturally occurring plant seed oils derived from soy bean seed, safflower seed, linseed, poppy seed, rapeseed, sunflower seed, cottonseed and corn.

The amount of non-petroleum based organic solvent which should be used with the soy inks of the present invention is from about 10% by weight of the total soy ink composition to about 90% by weight of the total soy ink composition, preferably from about 20% by weight of the total soy ink composition to about 60% by weight of the total soy ink composition. The balance of the composition comprises soy oil with conventional coloring pigments or dyes, resins, waxes, paraffins, shellacs, etc. Pigments are comprised of those readily available to the art or paint/coating industry. Dyes, also comprise those readily available to the art of paint/coating industry. Traditional pigments can of course be titanium oxides, zinc oxides, zinc sulfides, and lead pigments such as lead carbonate, or lead sulfates or sulfides, etc.

The amount of pigment or combinations or pigments and dyes depends upon the desired color. Pastel colors are achieved with the addition of titanium white or similar white pigment to a colored pigment. The pigment amount would vary from approximately 10% to 25% depending upon individual pigment wetting capabilities.

The particle size of pigment would not exceed 0.010 millimeters. A finer ground pigment would be required to feed through some fine-tipped drawing pens. Generally, pigment not exceeding 0.010 millimeters in particle diameter insures the versatility of the soy oil medium. A technical drafting pen would be the only restriction due to their extremely fine points which is subject to specific brands or manufactured instruments. Pigments ground not to exceed 0.010 millimeters is satisfactory for use in most ballpoint pen writing instruments.

When materials, as earlier specified, are used, they are found to have unusual advantages. Drying speed is significantly reduced or extended depending upon the percentage of additives. Drying time can be reduced to a few seconds or extended to several hours. An increase of non-petroleum solvent proportionately reduces drying time while a decrease in solvent and the addition of soya resins increases drying time. The addition of natural varnishes or shellacs, waxes and paraffins provides the soy medium with a slower drying time and more resistant surface film required for layering color when additional washes of color are desired. Drying time, resistance (film strength), brushability, body and coloration influence directly the intended use of the soy oil medium. Viscosity varies significantly when intended use requires a writing instrument or a coating brush.

Precise proportions of additives is directly related to the intended job performance required and the desired final visual or method used for application. Instant drying, non-bleeding, permanent drawing ink used in a drawing pen for use on paper requires a high viscosity while application with a brush or palette knife on canvas or board requires a low viscosity.

When the materials, as earlier specified, are used as either a newsprinting ink or as a new art medium which simulates the appearance of watercolors, they are found to have unusual advantages. Namely, the drying speed is significantly improved to within the range of from a few seconds up to an hour, compared to longer drying times for conventional or the original soy ink formula. Moreover, there is no smudging, bleeding onto the underlying paper, misting due to press application and the paper does not wrinkle, warp or move as normally expected when using such ink or watercolor. Thus, an improved newsprinting ink, a new oil based artist's medium can be used in lieu of watercolors or artist's drawing ink. It is entirely waterproof, unlike conventional drawing inks. Normal watercolors shrink or move conventional papers but this new medium does not. In short, this medium has all the advantages of watercolor without any of the disadvantages.

In another embodiment of the present invention, where it is desired that they soy ink be a base material to provide a thicker artist's medium or generally a paint covering, the soy ink is mixed with unthinned plant derived alkyd resins. Alkyd resins are, of course, known and they are the thermal setting reaction product of a polyhydric alcohol such as ethylene glycol or glycerol and a polybasic acid such as phthallic anhydride in the presence of a drying oil like linseed oil or tung oil which acts as a modifier. Alkyd resins are actually a type of polyester resin which has a similar derivation but is non-oil modified. The manner of making alkyd resin is generally well-known and need not be described herein. The alkyd resins that are useful from the standpoint of this invention are those that are derived from naturally occurring materials, especially soy alkyd resin, safflower alkyd resin, linseed alkyd resin, poppy seed alkyd resin, rapeseed alkyd resin, sunflower alkyd resin, cottonseed alkyd resin, or mixtures thereof. It is also possible that coconut alkyl resins, fish oil alkyd resins, castor oil alkyd resins, and recinene alkyd resins may be used.

These resins are all commercially available, and when used to make the thicker covering compositions of the present invention are generally used within the range of from about 10% by weight to 90% by weight of the soy ink, preferably from about 15% by weight to about 75% by weight of the soy ink.

This medium can be used as an art medium as other commonly used paint materials or can be used as a paint covering for interior or exterior painting. When formulated for an exterior coating the addition of pesticide and anti-bacterial materials would be required. This formula is chip resistant, does not wipe off, subjects itself to repeated scrubbing and appears to have above average weather resistance. Application to fabrics or leather yields extremely resistant non-bleeding or fading characteristics.

The following examples are offered to further illustrate but not limit the invention.

EXAMPLE 1

Soy ink black, red, yellow and blue, were purchased from General Printing Ink Company of Des Moines, Iowa. Each of these were mixed with 34% by weight of a pigment composition which comprised 11% of titanium dioxide, 2% zinc dioxide, and 21% calcium carbonate filler. With this as a vehicle was a composition that was 66% by weight of the total, with itself comprising 24% soy alkyd resin, 2% cobalt dryer, and a 40% blend of non-petroleum derived oletatic hydrocarbons To this base mixture was added various amounts and combinations of the red, yellow, blue and black premixed soy ink. This was successfully used as a paint for a variety of substrates. The paint was known to be resistent to water, not chip, have uniform color, and could be applied to virgin metal and even Tupperware ® with good results.

EXAMPLE 2

A water color was provided by use of soy ink, each of the available colors black, yellow, blue and red by mixing the soy ink with varying amounts of turpentine within the range of from 10% up to 90% turpentine. The intensity of the color varied depending on the amount of turpentine, with lesser amounts of turpentine providing for more brilliant colors, and of course greater amounts of turpentine achieving paler colors. Generally for pale colors 90% turpentine is satisfactory, and for brilliant colors 10% is satisfactory. This mixture was used as a water color type medium and dried at the higher levels of turpentine within 5 seconds, and at the lower levels within 15 minutes. After drying on conventional artist's water color paper, it was observed over several months period of time. No fading was observed, even when placed in the sun. It was also water resistent. The paintings could be water washed if desired. The artist's paper did not shrink, nor did it wrinkle like normally happens with water color.

EXAMPLE 3

When a water solvent medium was desired, latex resins were substituted for plant derived alkyd resins and thus rendered the medium water soluble as well as lended itself to the above same aforementioned characteristics. Unlike other water soluble mediums, due to the soy oil content as well as the latex resins, water fastness was maintained, fading unobserved and performance was consistent.

Unlike the aforementioned formulation, clean up did not require a solvent but was readily accomplished with soap and water. Naturally, a lower toxicity due to the deletion of solvent distillant such as turpentine was achieved.

EXAMPLE 4 (SOY OIL COMPARISON EXAMPLE)

Comparison of soy oil based ink/medium when petroleum based products are used and when non-petroleum based products are used as a solvent to change viscosity or characteristics of desired formula is here demonstrated.

When the pre-mixed so ink of Example 1, ¼ teaspoon, is added to mineral spirits, 10 teaspoons, the mixture resists dispersion, clumps on agitator, settles to the bottom of adheres to the sides of the container. When the proportion of mineral spirits is reduced to a 1:1 ratio or ¼ t. soy ink and ¼ t. mineral spirits, these undesirable characteristics diminish but still adversely affect performance. Drying time is severely retarded, uneven, pigment dispersion on substrates is uneven, rub-off, blurrings, misting and gumming of the applicator is evidenced. Clean up is difficult and not within acceptable standards.

The observed slow drying time, uneven drying time, misting, gumming and rub-off identically mimics the problems publishers experienced when first using the newly developed soy ink and directly influenced the reluctance and unpopularity of the soy ink. Publishers or printers were accustomed to using petroleum solvents to change the viscosity of the inks used to print on varied papers or run different presses. In the past, prior to the soy oil based ink, petroleum based inks were used almost exclusively for printing jobs. During trial tests of the new soy ink, petroleum based solvents were automatically used to change the formulation, most probably because these additives were available and fit within the boundaries of "common knowledge information." This magnified the problems.

When the same pre-mixed soy ink, ¼ teaspoon, is added to 100% pure gum turpentine, 10 teaspoons, the mixture disperses immediately, remains in suspension with little settling over time, dries immediately, does not rub-off, or display negative characteristics. When application with a brush to "wash on color" this diluted mixture is used. When a mixture of 1:1, or ¼ t. soy ink and ¼ t. gum turpentine is mixed there is no difference in dispersion, even mixing or gumming evidenced. Clean up is within acceptable boundaries.

When a coating mixture is required, soya resin and gum turpentine was used in addition to talc, clay, other thickeners and fillers. Drying time was longer but within comparable standards. This formulation closely mimics petroleum or linseed based products on the market.

However, when petroleum based resins or resins containing a greater proportion of petroleum and thus thinner resins and petroleum based solvents are mixed to formulate a coating or paint-like mixture, undesirable problems result closely mimicing problems observed with the thinner first example. Settling occurs, uneven drying and gumming is evidenced.

I claim:

1. An ink composition which simulates the appearance of water colors, but is waterproof comprising:
a mixture of soy ink and a non-petroleum based organic solvent for soy ink which improves soy ink drying speed, selected from the group consisting of plant seed oils, plant alkyd resins, varnishes, shellac, terpene oils and modified terpene oils, said organic solvent being from about 10% by weight to about 90% by weight of said ink composition and said ink composition being substantially waterproof when dry.

2. The ink composition of claim 1 wherein the amount of solvent is from about 20% by weight to about 60% by weight of the ink composition.

3. The ink composition of claim 1 wherein the non-petroleum based organic solvent which improve soy ink drying speed is selected from the group consisting of terpene, acetone, and thinned plant seed oils, or mixtures thereof.

4. The ink composition of claim 3 wherein said non-petroleum based organic solvent is terpene.

5. A paint composition, comprising:
soy ink, pigment and a natural non-petroleum alkyd resin, the amount of said resin comprising from about 10% by weight to about 90% by weight of said paint.

6. The paint composition of claim 5 comprising from about 15% by weight to about 75% by weight of said natural alkyd resin.

7. The paint composition of claim 6 wherein the alkyd resin is a plant seed oil resin.

8. The paint composition of claim 7 wherein the plant seed resin is selected from the group consisting of soy resin, safflower resin, linseed resin, poppy seed resin, rapeseed resin, and sunflower resin, or mixtures thereof.

9. The paint composition of claim 8 wherein the resin is soy resin.

* * * * *